United States Patent
Hsu et al.

(10) Patent No.: US 10,083,377 B2
(45) Date of Patent: Sep. 25, 2018

(54) SENSING METHOD FOR A COUNTERFEIT BILL DETECTOR

(71) Applicant: CLIMAX MACHINE INDUSTRY CO., LTD., New Taipei (TW)

(72) Inventors: Tien-Lu Hsu, New Taipei (TW);
Chun-Yen Chen, New Taipei (TW);
Shin-Nung Lu, New Taipei (TW);
Jhih-Cheng Syu, New Taipei (TW);
Che-Chang Hsu, New Taipei (TW)

(73) Assignee: CLIMAX MACHINE INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/604,259

(22) Filed: May 24, 2017

(65) Prior Publication Data
US 2018/0157935 A1 Jun. 7, 2018

(30) Foreign Application Priority Data
Dec. 6, 2016 (TW) .............................. 105140191 A

(51) Int. Cl.
*G06K 9/62* (2006.01)
(52) U.S. Cl.
CPC ......... *G06K 9/6267* (2013.01); *G06K 9/6201* (2013.01)
(58) Field of Classification Search
CPC .................. G06K 9/6267; G06K 9/6201
USPC ........................................... 382/135
See application file for complete search history.

(56) References Cited

FOREIGN PATENT DOCUMENTS

| CN | 103903326 | * | 7/2014 |
| CN | 103903326 A | | 7/2014 |
| CN | 204087236 U | | 1/2015 |
| JP | 201306440 | * | 10/2013 |
| TW | M473572 U | | 3/2014 |

OTHER PUBLICATIONS

TIPO office action dated Aug. 2, 2017.

* cited by examiner

*Primary Examiner* — Amandeep Saini
(74) *Attorney, Agent, or Firm* — Rabin & Berdo, P.C.

(57) ABSTRACT

A sensing method for a counterfeit bill detector includes (i) using multiple image-sensing modules to scan multiple pieces of image information of a bill and converting the multiple pieces of image information into multiple values of digital image, (ii) comparing each value of digital image with a pre-stored image threshold value to generate a reference value, (iii) adding the multiple reference values to generate an image validation value, (iv) comparing the image validation value with a pre-stored validation threshold value to acquire a comparison result, and (v) determining if the multiple pieces of image information are valid according to the comparison result. The sensing method tackles the issue of unsynchronized actions in bill sensing and bill scanning and simultaneously eliminates the problem of distorted scanned bill image arising from entry of misaligned bill to improve accuracy in bill validation.

12 Claims, 7 Drawing Sheets

SENSING METHOD FOR A COUNTERFEIT BILL DETECTOR

BACKGROUND OF THE INVENTION

1. Field of the Invention

The present invention relates to a counterfeit bill detector and, more particularly, to a sensing method using a rotational sensor in collaboration with a control unit and multiple image sensors to enhance accuracy in detecting counterfeit bill.

2. Description of the Related Art

Counterfeit bill detector is one of the most common tools used by employees in financial businesses, enterprises, corporations and accounting firms for the purpose of counting and counterfeit detection and is demanded to make quick and accurate detection without causing loss and mistrust from customers because of error in bill counting and/or counterfeit detection.

With reference to FIG. 6, a conventional media validation module 70 includes two location sensors 71 and multiple image-scanning modules 72. The location sensors 71 serve to sense if bills enter the multiple image-scanning modules 72. Preferably, the location sensors 71 are optical sensors and each location sensor 71 includes a signal transmitter 711 and a signal receiver 712. When a motor drives a conveyor to send bills into the media validation module 70, the bills block optical signals transmitted from the signal transmitters 711 to the respective signal receivers 712 as a determination basis that the bills have entered the media validation module 70.

When the location sensors 71 sense the entry of the bills and the bills pass through the location sensors 71, the media validation module 70 start driving the multiple image-scanning modules 72 to scan the bills after a preset delay time.

Furthermore, with reference to FIG. 7, a schematic diagram shows bills entering a conventional counterfeit bill detector. When the bills are misaligned and enter the image validation module 70, the location sensors 71 are blocked by the bills and determine that the bills have entered the image validation module 70.

However, as bills in the conventional image validation module 70 are sent into the counterfeit bill detector through the conveyor driven by the motor and the load driven by the motor varies over time, the motor is not stably rotated at a same speed. Besides, the bills can be scanned after a preset time when the location sensors 71 are blocked by the bills. Hence, accuracy reduction in counterfeit bill detection arises from distorted scanned images of the bills, such as similar lines or stripes with different strokes, caused by such unsynchronized bill sensing and bill scanning.

With further reference to FIG. 7, when a misaligned bill enters the conventional media validation module 70 and the location sensors 71 sense the bill entering the media validation module 70, certain portion of the bill may have already extended beyond a scanning range of the image-scanning module 72, causing generation of distorted image, such as image with a missing corner. Such distorted or incomplete bill image gives rise to difficulty in later bill recognition.

SUMMARY OF THE INVENTION

An objective of the present invention is to provide a sensing method for a counterfeit bill detector to eliminate distorted scanned image of bill and enhance accuracy in bill validation.

To achieve the foregoing objective, the sensing method includes steps of:

using multiple image-sensing modules to scan multiple pieces of image information of a bill and converting the multiple pieces of image information into multiple values of digital image;

comparing each value of digital image with a pre-stored image threshold value to generate a reference value;

adding the multiple reference values to generate an image validation value;

comparing the image validation value with a pre-stored validation threshold value to acquire a comparison result; and determining if the multiple pieces of image information are valid according to the comparison result.

After sensing a unitary rotational displacement of the motor gear, the rotation sensor outputs a rotation signal to the control unit and the control unit outputs a control signal to the image-sensing module to scan the bill, such that distortion occurring in the scanned image of the bill because of unstable motor speed can be avoided. As the multiple image-sensing modules employed in the sensing method scan the bill by way of line-scan, missing portion or distortion of scanned image of the bill arising from single-point fixed bill scanning can be eliminated and the accuracy in bill validation can be enhanced accordingly.

Other objectives, advantages and novel features of the invention will become more apparent from the following detailed description when taken in conjunction with the accompanying drawings.

DETAILED DESCRIPTION OF THE INVENTION

Figure 1:
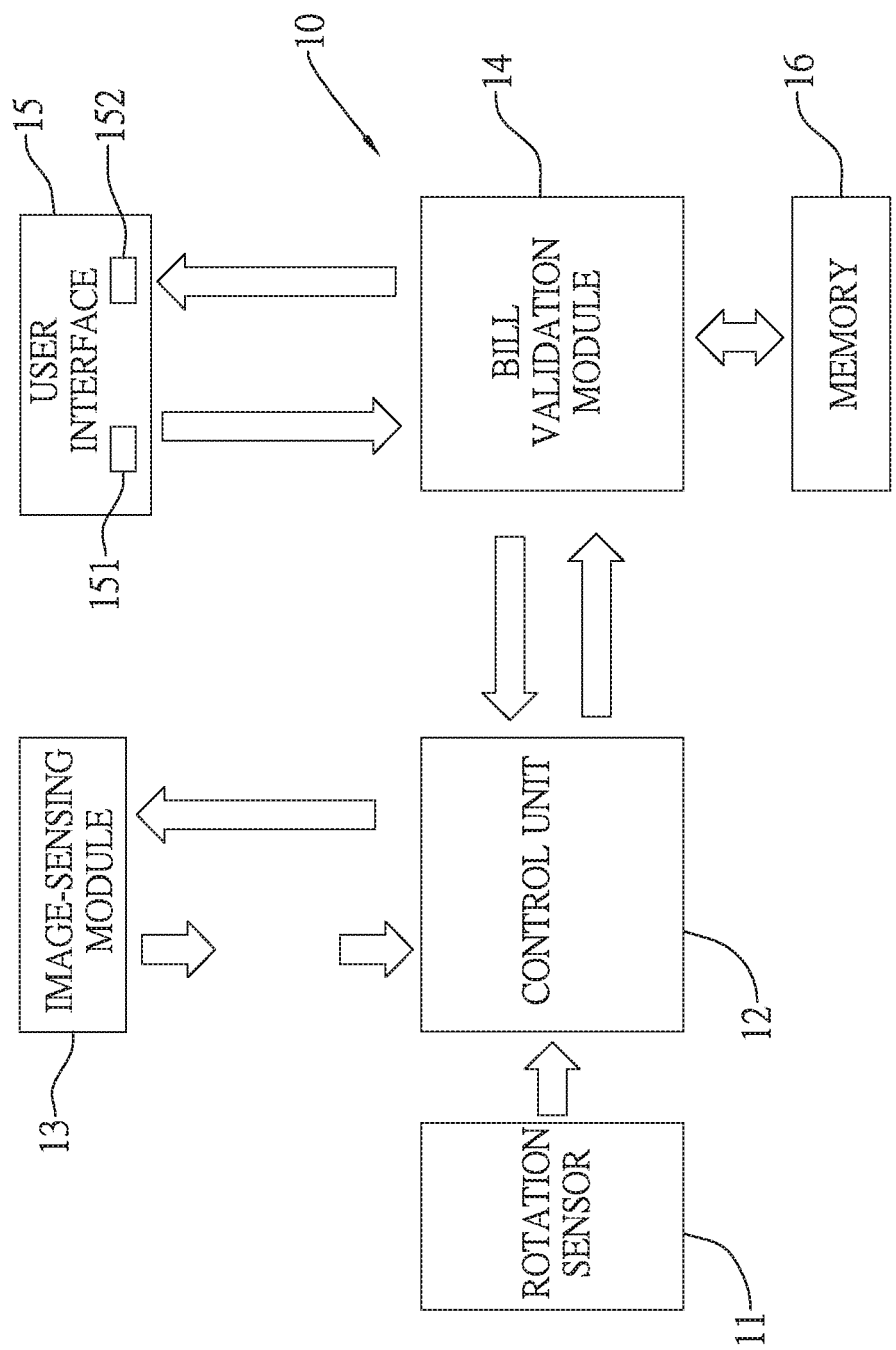
FIG. 1 is a functional block diagram of a counterfeit bill detector in accordance with the present invention.
Figure 2:
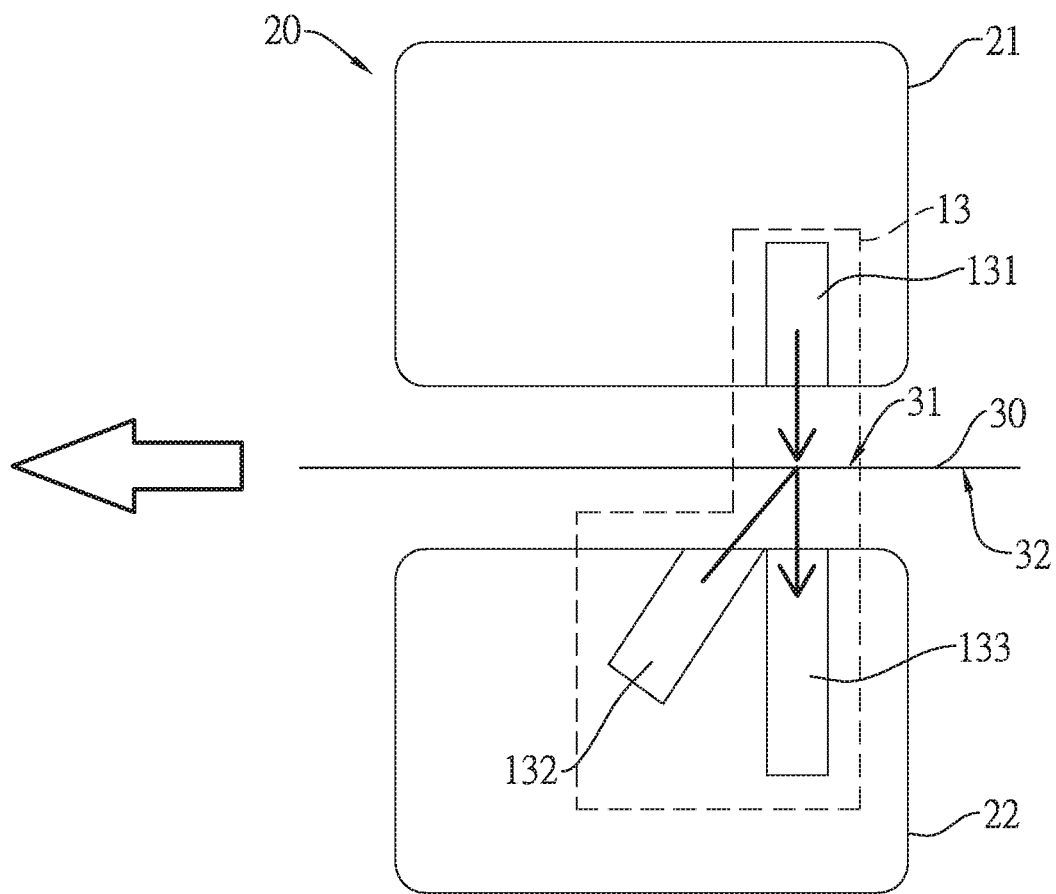
FIG. 2 is a schematic cross-sectional view of an embodiment of a counterfeit bill detector in accordance with the present invention.

With reference to FIGS. 1 and 2, an embodiment of a counterfeit bill detector 10 in accordance with the present invention includes a rotation sensor 11, a control unit 12, an image-sensing module 13, a bill validation module 14 and a user interface 15. The counterfeit bill detector 10 serves to detect if a bill is real or fake. The counterfeit bill detector 10 may be implemented by a media validation module 20 as shown in FIG. 2, which can be used to both sense and scan bills and may be also applied to detect if a marketable security is real or fake.

The rotation sensor 11 is electrically connected to the control unit 12 and senses a unitary rotational displacement of a gear mounted on a spindle of a motor of the counterfeit bill detector 20. When sensing the unitary rotational displacement of the motor, the rotation sensor 11 outputs a rotation signal to the control unit 12. The unitary rotational displacement may be an angular displacement measured in degrees of a gear to be sensed. Once the motor drives the gear to rotate the unitary rotational displacement, the bill 30 will be moved over a fixed distance. Furthermore, as the sizes of the bills vary from country to country, the unitary rotational displacement may vary to adapt to validation of different types of bills.

The control unit 12 is preferred to be a field programmable gate array (FPGA) and is electrically connected to the image-sensing module 13. After receiving the rotation signal (mechanical clock signal MCLK) of the rotation sensor 11, the control unit 12 outputs a control signal to the image-sensing module 13 according to the rotation signal to drive the image-sensing module 13 to scan the bill 30.

The image-sensing module 13 has a first transmitter 131, a second transmitter 132 and a first receiver 133. The counterfeit bill detector 20 may be divided into a first region 21 and a second region 22. The first transmitter 131 is mounted inside the first region 21, and the second transmitter 132 and the first receiver 133 are mounted inside the second region 22. The first transmitter 131 may transmit infrared (IR) light. The second transmitter 132 may transmit colored light (RGB) or IR light. The first transmitter 131 and the first receiver 133 are arranged to face each other. The second transmitter 132 and the first receiver 133 are juxtaposedly arranged. Preferably, the image-sensing module 13 is a CIS (CMOS (Complementary Metal Oxide Semiconductor) image Sensor) module.

When receiving the MCLK signal for the first time, the control unit 12 generates a first control signal and a second control signal in sequence according to the MCLK signal. When the image-sensing module 13 receives the first control signal, the first transmitter 131 transmits a first image-scanning signal (IR light) to a first side 31 of the bill for image scanning The first image-scanning signal penetrating through the first side 31 of the bill is converted into a first scanned image result, which is received by the first receiver 133 and is transmitted by the first receiver 133 to the control unit 12. When the image-sensing module 13 receives the second control signal, the second transmitter 132 transmits a second image-scanning signal (RGB light) to a second side 32 of the bill 30 for image scanning The second image-scanning signal reflected by the second side 32 of the bill 30 is converted into a second scanned image result, which is received by the first receiver 133 and is transmitted by the first receiver 133 to the control unit 12.

When receiving the MCLK signal for the second time, the control unit 12 generates a third control signal and a fourth control signal in sequence according to the MCLK signal. When the image-sensing module 13 receives the third control signal, the second transmitter 132 transmits a third image-scanning signal (IR light) to the second side 32 of the bill for image scanning The third image-scanning signal reflected from the second side 32 of the bill is converted into a third scanned image result, which is received by the first receiver 133 and is transmitted by the first receiver 133 to the control unit 12. When the image-sensing module 13 receives the fourth control signal, the second transmitter 132 transmits a fourth image-scanning signal (RGB light) to the second side 32 of the bill 30 for image scanning The fourth image-scanning signal reflected by the second side 32 of the bill 30 is converted into a fourth scanned image result, which is received by the first receiver 133 and is transmitted by the first receiver 133 to the control unit 12.

According to the first to fourth control signals, the image-scanning module 13 scans the first side 31 and the second side 32 of the bill 30. The image-sensing module 13 may scan the first side 31 and then the second side 32 or scan the second side 32 and then the first side 31.

The bill validation module 14 is electrically connected to the control unit 12 for the control unit 12 to receive the first to fourth scanned image results, convert the first to fourth scanned image results into values of first to fourth digital images, and compare the values of the first digital image to determine if the bill is a valid bill. If the determination result is positive, the values of the first to fourth digital images are sequentially sent to the bill validation module for validation of the bill 30. In the present embodiment, the bill validation module 14 further includes a memory 16 for storage of authentic image recognition information of the bill 30, such as a mean value of each block of the bill 30, projection amount, texture measurement, and the like. The bill validation module 14 sequentially compares the received values of the first to fourth images with the authentic image recognition information in the memory 16 to determine if the bill 30 is fake or authentic and output a validation signal. The user interface 15 is electrically connected to the bill validation module 14 to receive the validation signal to display a validation result according to the authentication signal for users to view.

Users can configure the counterfeit bill detector 10 to select a type of bill to be scanned through the user interface 15 before validation of the bill 30. The user interface 15 sends an operation mode signal to the bill validation module 14 for the bill validation module 14 to be aware of the type of the bill 30 to be scanned and further sends the operation mode signal to the control unit 12 for the control unit 12 to be aware of the angular displacement of the gear defined by the unitary rotational displacement for scanning of the first side 31 and the second side 32 of the bill 30.

The user interface 15 has an input unit 151 and a display unit 152. The input unit 151 serves to enter the type of the bill 30 to be scanned. The display unit 152 may be a liquid crystal display or an indicator. The liquid crystal display serves to directly display the validation result of the bill 30. The indicator serves to show the validation result by means of signal indication, such as red light or green light.

Figure 3:
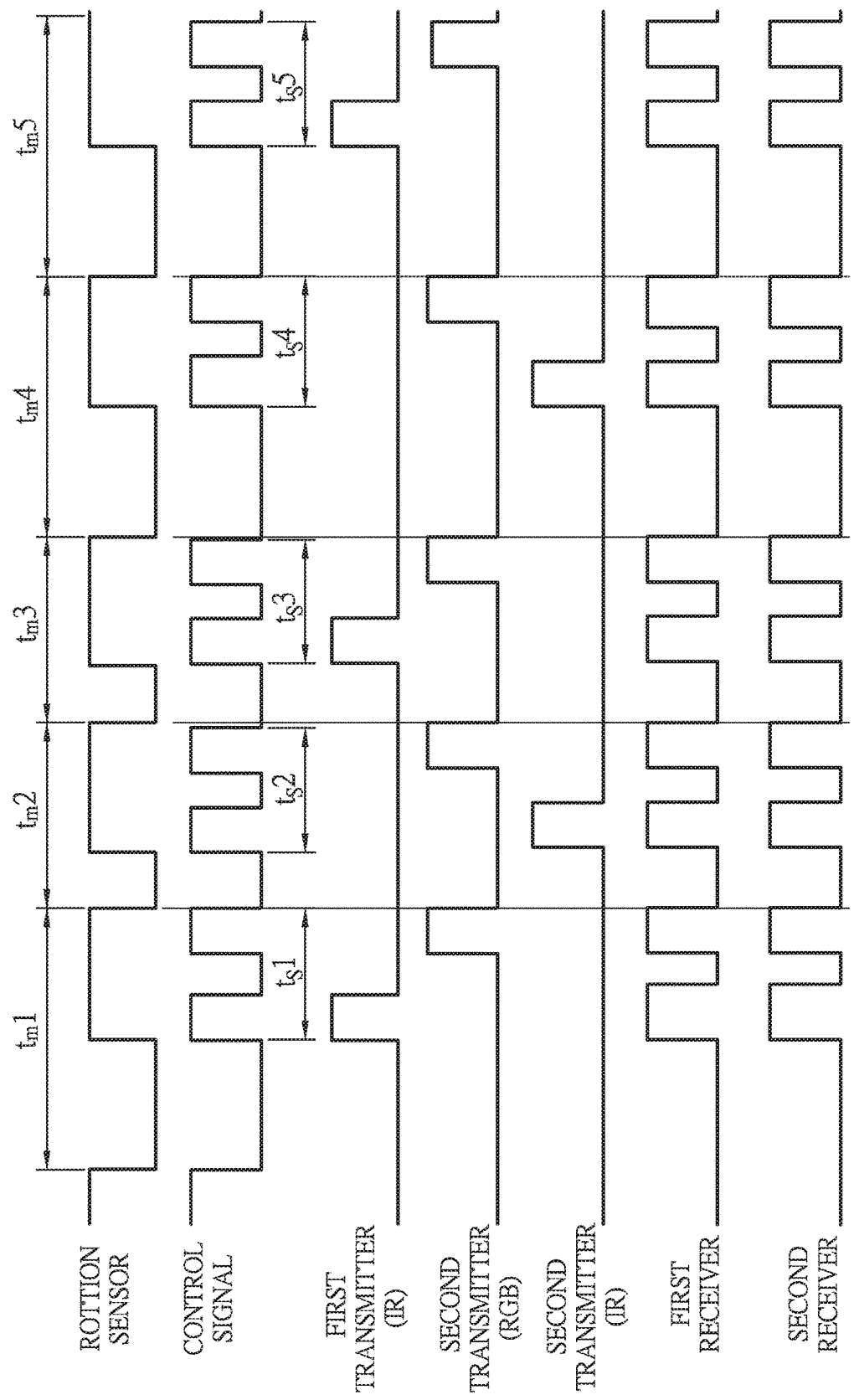
FIG. 3 is a timing diagram showing signals of a rotation sensor and an image-sensing module and control signals of the counterfeit bill detector in FIG. 1.

With reference to FIGS. 2 and 3, the rotation sensor 11 outputs a high-level rotation signal to the control unit 12 every time the motor rotates the unitary rotational displacement. When the rotation sensor 11 outputs the high-level rotation signal in a first signal-scanning duration ($t_S1$), the control unit 12 sequentially outputs a first control signal and a second control signal. A time delay between the first control signal and the second control signal is pre-defined in the control unit 12. When receiving the first control signal, the first transmitter 131 of the image-sensing module 13 transmits the first image-scanning signal to scan the first side 31 of the bill 30 and pass through the first side 31 of the bill 30 in the first signal-scanning duration ($t_S1$), and the first receiver 133 receives the first scanned image result in the first signal-scanning duration ($t_S1$). Then, when receiving the second control signal, the second transmitter 132 transmits the second image-scanning signal that scans the second side 32 of the bill 30 and is reflected by the second side 32 in the first signal-scanning duration ($t_S1$), and the first receiver 133 receives the second scanned image result in the first signal-scanning duration ($t_S1$).

When the rotation sensor 11 outputs the high-level rotation signal in a second signal-scanning duration ($t_S2$), the control unit 12 sequentially outputs a third control signal and a fourth control signal. A time delay between the third control signal and the fourth control signal is pre-defined in the control unit 12. When receiving the third control signal, the second transmitter 132 of the image-sensing module 13 transmits the third image-scanning signal (IR light) that scans the second side 32 of the bill 30 and is reflected by the second side 32 in the second signal-scanning duration ($t_S2$), and the first receiver 133 receives the third scanned image result in the second signal-scanning duration ($t_S2$). Then, when receiving the fourth control signal, the second transmitter 132 transmits the fourth image-scanning signal (RGB light) that scans the second side 32 of the bill 30 and is reflected by the second side 32 in the second signal-scanning duration ($t_S2$), and the first receiver 133 receives the fourth scanned image result in the second signal-scanning duration ($t_S2$).

As can be seen from FIG. 3, first to fifth rotation durations ($t_m1$~$t_m5$) of the motor required to rotate the unitary rotational displacement vary from each other in length of time as the motor does not provide a stable speed. For example, to rotate the unitary rotational displacement, the second rotation duration ($t_m2$) is longer than the third rotation duration ($t_m3$). In contrast to the first to sixth rotation durations ($t_m1$~$t_m5$), the first signal-scanning duration to the sixth signal-scanning duration ($t_S1$~$t_S5$) may be substantially the same or different.

As the first transmitter 131 and the second transmitter 132 of the image-sensing module 13 output the first image-scanning signal to the fourth image-scanning signal after rotation of the first unitary rotational displacement and the second unitary rotational displacement respectively, meaning that scanning of the bill 30 only happens when the gear of the motor is rotated to and stopped at a fixed position, the scanning time of the bill ($t_S1$~$t_S5$) that is then started improves the issue of distorted scanned image of bill.

Figure 4:
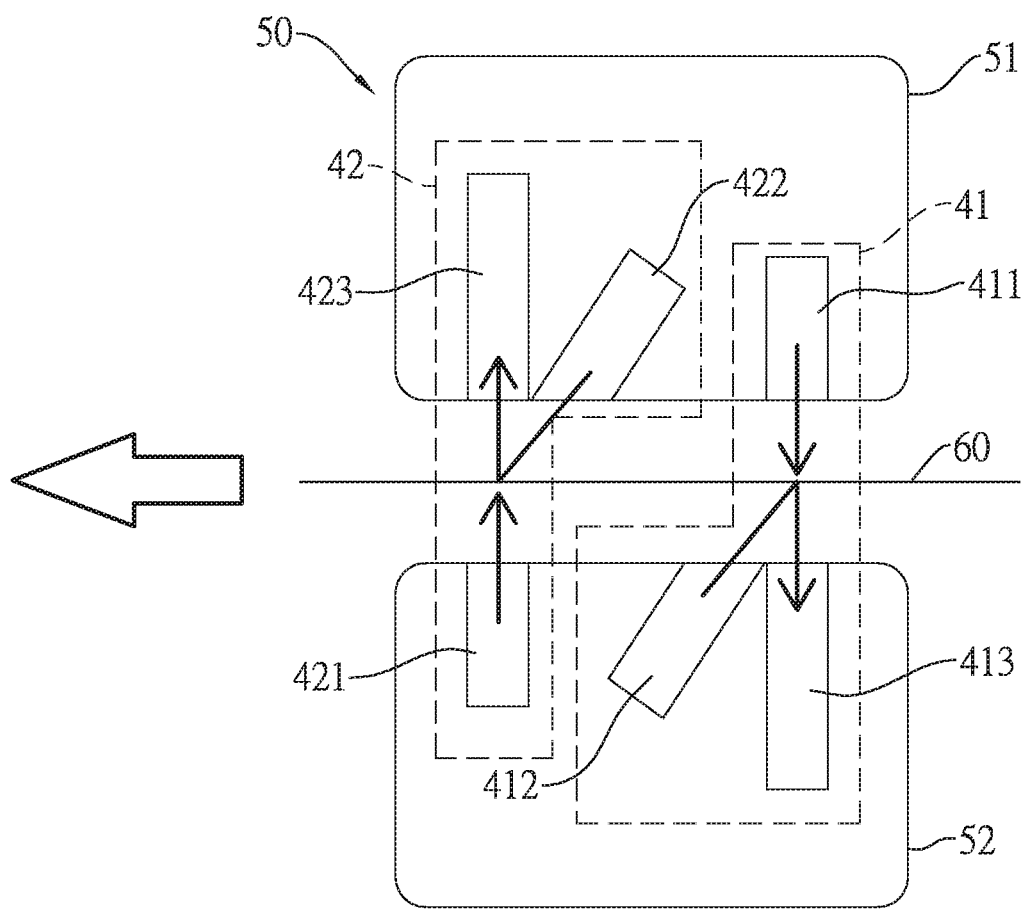
FIG. 4 is a schematic cross-sectional view of another embodiment of a counterfeit bill detector in accordance with the present invention.

Another embodiment of a counterfeit bill detector in accordance with the present invention differs from the foregoing embodiment in having multiple image-sensing modules and may be implemented as a media validation module 50 as shown in FIG. 4. Based on the accuracy in bill validation desired by users, the media validation module 50 may be installed with different number of image-sensing modules tailored to that need. In the present embodiment, the counterfeit bill detector 50 includes a first image-sensing module 41 and a second image-sensing module 42. The first image-sensing module 41 has a first transmitter 411, a second transmitter 412 and a first receiver 413. The second image-sensing module 42 has a first transmitter 421, a second transmitter 422 and a second receiver 423.

Similarly, the media validation module 50 can be also divided into a first region 51 and a second region 52. The first transmitter 411 of the first image-sensing module 41, the second transmitter 422 and the second receiver 423 of the second image-sensing module 42 are mounted inside the first region 51.

The second transmitter 412 and the first receiver 413 of the first image-sensing module 41 and the first transmitter 421 of the second image-sensing module 42 are mounted inside the second region 52. The first transmitter 411 and the first receiver 413 of the first image-sensing module 41 are arranged to face each other. The second transmitter 412 and the first receiver 413 are juxtaposedly arranged. The first transmitter 421 and the second receiver 423 of the second image-sensing module 42 are arranged to face each other. The second transmitter 422 and the second receiver 423 of the second image-sensing module 42 are juxtaposedly arranged.

With further reference to FIG. 3, when a bill 60 enters the media validation module 50, the motor of the counterfeit bill detector 10 starts rotating, the rotation sensor 11 outputs a high-level rotation signal every time the motor rotates the unitary rotational displacement. When the rotation sensor 11 outputs the high-level rotation signal in the first signal-scanning duration ($t_S1$), the control unit 12 sequentially outputs a first control signal and a second control signal. A time delay between the first control signal and the second control signal is pre-defined in the control unit 12. When receiving the first control signal, each of the first transmitters 411, 421 of the first image-sensing modules 41 and the second image-sensing module 42 transmits the first image-scanning signal to pass through the bill 60 in the first signal-scanning duration ($t_S1$), and the first receiver 413 and the second receiver 423 respectively receive the first scanned image results from the first transmitters 411, 421 in the first signal-scanning duration ($t_S1$). Then, when receiving the second control signal, each of the second transmitters 412, 422 of the first image-sensing modules 41 and the second image-sensing module 42 transmits the second image-scanning signal (RGB light) that respectively scans the second side 32 and the first side 31 of the bill 60 and is reflected by the bill 60 in the first signal-scanning duration ($t_S1$), and the first receiver 413 and the second receiver 423 respectively receives the second scanned image results from the second transmitters 412, 422 in the first signal-scanning duration ($t_S1$).

When the rotation sensor 11 outputs the high-level rotation signal in a second signal-scanning duration ($t_S2$), the control unit 12 sequentially outputs a third control signal and a fourth control signal. A time delay between the third control signal and the fourth control signal is pre-defined in the control unit 12. When receiving the third control signal, the second transmitters 412, 422 of the first image-sensing module 41 and the second image-sensing module 42 transmits the third image-scanning signals (IR light) that scan the bill 60 and is reflected by the bill 60 to the first receiver 413 and the second receiver 423 in the second signal-scanning duration ($t_S2$). Then, when receiving the fourth control signal, the second transmitters 412, 422 transmits the fourth image-scanning signals (RGB light) that scan the bill 60 and is reflected by the bill 60 to the first receiver 413 and the second receiver 423 in the second signal-scanning duration ($t_S2$). When the rotation sensor 11 output the high-level rotation signal in a third signal-scanning duration ($t_S3$) and in a fourth signal-scanning duration ($t_S4$), operation of the bill validation module 50 repeats the operation as done in the first signal-scanning duration ($t_S1$) and the second signal-scanning duration ($t_S2$). With the first image-sensing module 41 and the second image-sensing module 42, the objective of capturing image of the bill 60 can be attained just the same. Since there is an additional result of reflected image of the bill provided by the second image-sensing module 42, the reflected images of both sides of the bill can be provided to enhance in validation accuracy of the bill 60.

Figure 5:
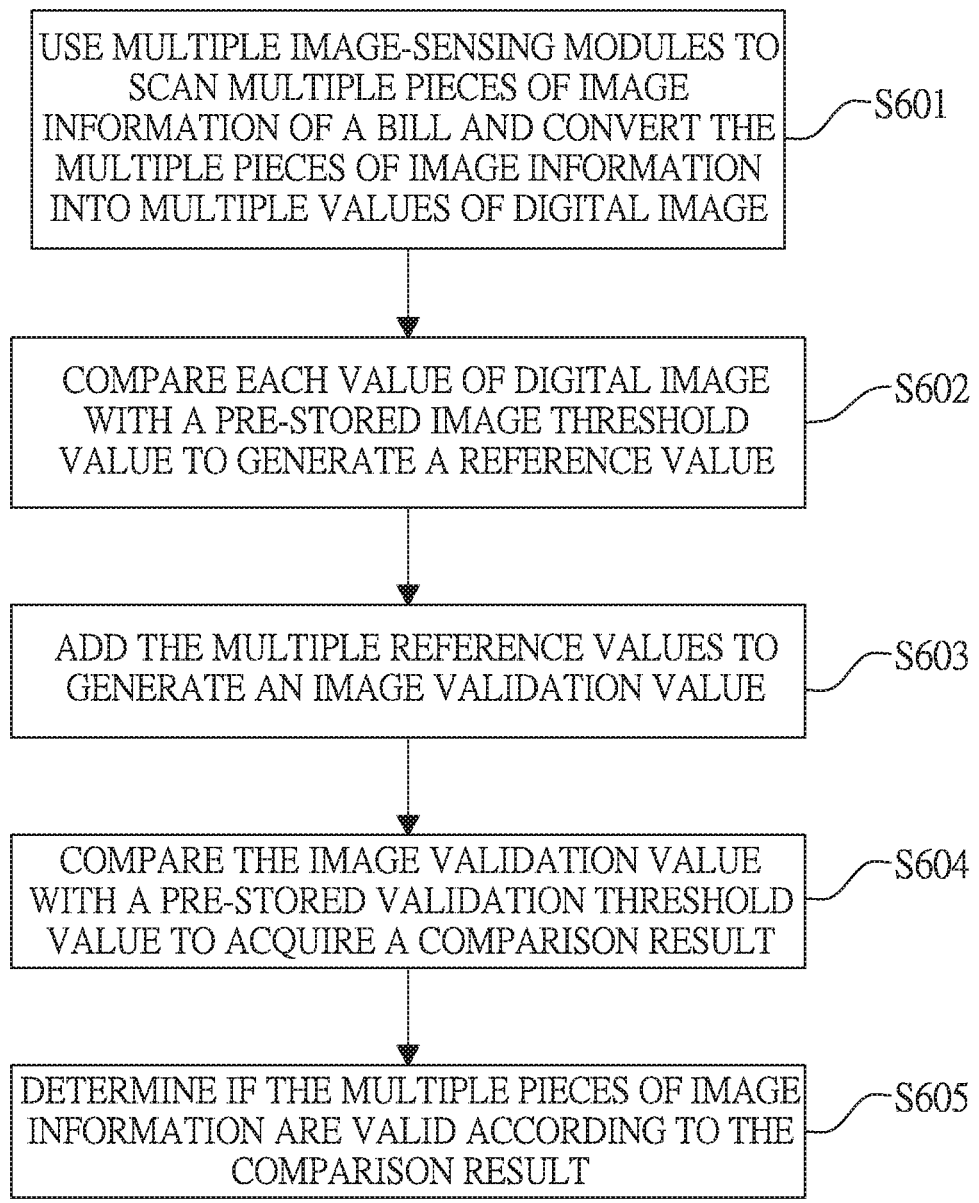
FIG. 5 is a flow diagram of a sensing method for the counterfeit bill detector in FIG. 1.
Figure 6:
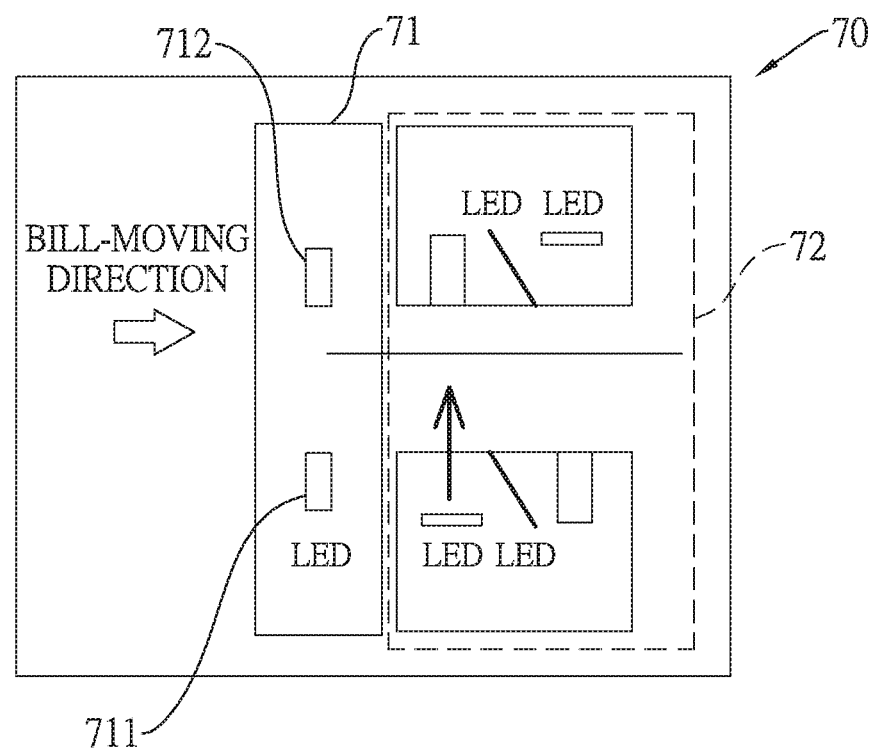
FIG. 6 is a schematic cross-sectional view of a conventional counterfeit bill detector.
Figure 7:
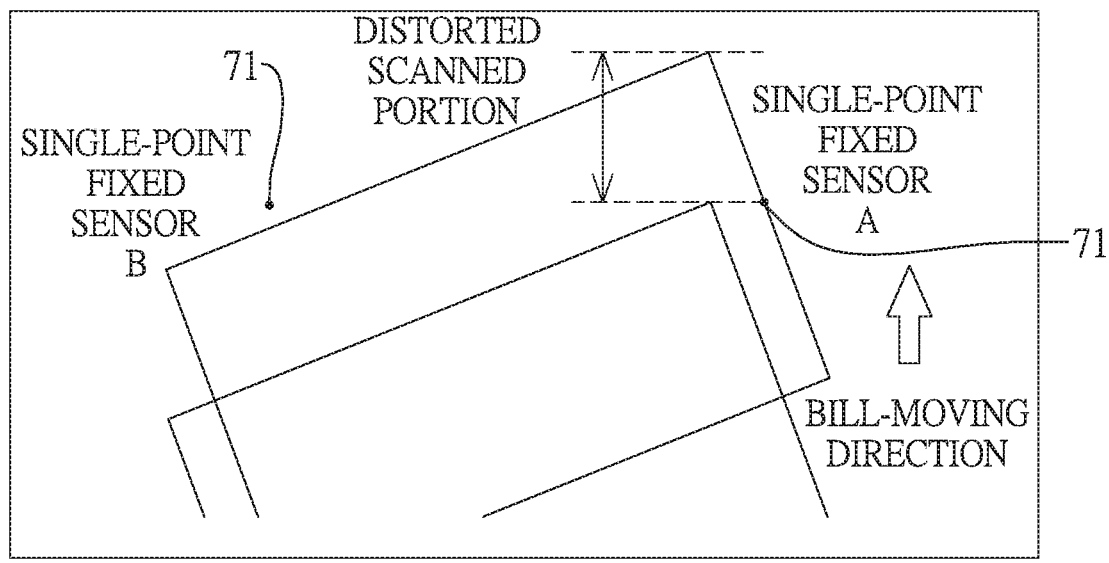
FIG. 7 is a schematic view showing bills entering the conventional bill detector in FIG. 6.

With reference to FIG. 5, a sensing method for the foregoing counterfeit bill detector in accordance with the present invention includes the following steps.

Step S601: Use multiple image-sensing modules 13 to scan multiple pieces of image information of a bill when the media validation module 50 detects that the bill enters the counterfeit bill detector, convert the multiple pieces of image information into multiple values of digital image. In other words, the multiple image-sensing modules 13 continuously scan bills on a conveyor of the counterfeit bill detector by way of line-scan and convert the scanned images into the values of the digital images.

Step S602: Compare each value of digital image with a pre-stored image threshold value to generate a reference value. The image threshold value may be a luminance threshold of image or a contrast threshold of image. The control unit 12 as shown in FIG. 1 has the image threshold value configured and stored in the control unit 12 beforehand, compares the image threshold value with each value of digital image, and generates multiple reference values according to the comparison results.

For example, there are four values of digital image, namely 215, 178, 211 and 197, and the image threshold is 200. Each value of digital image is compared with the image threshold value stored in the control unit 12. When the value of digital image is greater than the image threshold value, the reference value 1 is generated. When the value of digital image is less than the image threshold value, the reference value 0 is generated. The example given above is just taken to explain relationship among the values of digital image, the image threshold and the reference values instead of being treated as limitation confining the values of digital image, the image threshold and the reference values. For example, when the value of digital image is greater than the image threshold value, the reference value 0 is generated, and when the value of digital image is less than the image threshold value, the reference value 1 is generated. The reference value may be defined as a value other than 0 or 1.

Step S603: Add the multiple reference values to generate an image validation value. The control unit 12 adds the multiple reference values acquired in step S602 to obtain a sum and define the sum as an image validation value.

Step S604: Compare the image validation value with a validation threshold value pre-configured and pre-stored in the control unit 12 to acquire a comparison result. The control unit 12 compares the image validation value acquired in step S603 with the validation threshold value stored in the control unit 12 to determine if the scanned image of the bill is validated. Depending on type of currency, the counterfeit bill detector can change the validation value stored in the control unit 12.

Step S605: According to the comparison in step S604, determine if the multiple pieces of image information are valid. For example, when the control unit 12 acquires the comparison result that the image validation value is greater than the validation threshold value, it indicates that the multiple pieces of image information are valid and the multiple values of digital image are outputted, and when the control unit 12 acquires the comparison result that the image validation value is less than the validation threshold value, it indicates that the multiple pieces of image information are invalid. In an example when the sum of the multiple reference values 1+0+1+0 is equal to 2 and the validation threshold value is 3, the multiple pieces of image information are determined to be invalid, and the bill needs to wait for next round of scanning Nevertheless, the validation threshold value is a reference value for validation, and different validation thresholds have different ways of validation. Under different circumstance, when the comparison result that the image validation value is less than the validation threshold value, it indicates that the multiple pieces of image information are valid and the multiple values of digital image are outputted, and when the comparison result that the image validation value is greater than the validation threshold value, it indicates that the multiple pieces of image information are invalid.

In sum, in view of the identification device of the counterfeit bill detector and the sensing method for the counterfeit bill detector, the rotational displacement of the gear driven by the motor can be detected, and control signals can be transmitted through the rotation sensor and the control unit connects with the image-sensing module for bill scanning Accordingly, the issue of distorted scanned bill image caused by unstable motor speed can be improved. Besides, the image-sensing module is used to replace the conventional location sensors. Instead of the way of single-point fixed sensing, the image-sensing module employs the way of line-scan to further increase accuracy in image validation and overcome the problem of missing portion in scanned image.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A sensing method for a counterfeit bill detector, comprising steps of:
   using multiple image-sensing modules to scan multiple pieces of image information of a bill and converting the multiple pieces of image information into multiple values of digital image;
   comparing each value of digital image with a pre-stored image threshold value to generate a reference value;
   adding the multiple reference values to generate an image validation value;
   comparing the image validation value with a pre-stored validation threshold value to acquire a comparison result; and
   determining if the multiple pieces of image information are valid according to the comparison result.

2. The sensing method as claimed in claim 1, wherein the step of comparing the image validation value with a pre-stored validation threshold value is performed by a control unit to compare the image validation value and the validation threshold value.

3. The sensing method as claimed in claim 1, wherein the comparison result acquired when the image validation value is greater than the validation threshold value indicates that the multiple pieces of image information are valid, and the multiple values of digital image are outputted.

4. The sensing method as claimed in claim 2, wherein the comparison result acquired when the image validation value is greater than the validation threshold value indicates that the multiple pieces of image information are valid, and the multiple values of digital image are outputted.

5. The sensing method as claimed in claim 1, wherein the comparison result acquired when the image validation value is less than the validation threshold value indicates that the multiple pieces of image information are valid, and the multiple values of digital image are outputted.

6. The sensing method as claimed in claim 2, wherein the comparison result acquired when the image validation value is less than the validation threshold value indicates that the multiple pieces of image information are valid, and the multiple values of digital image are outputted.

7. The sensing method as claimed in claim 1, wherein the comparison result acquired when the image validation value is greater than the validation threshold value indicates that the multiple pieces of image information are invalid, and the bill is scanned again.

8. The sensing method as claimed in claim 2, wherein the comparison result acquired when the image validation value is greater than the validation threshold value indicates that the multiple pieces of image information are invalid, and the bill is scanned again.

9. The sensing method as claimed in claim 1, wherein the comparison result acquired when the image validation value is less than the validation threshold value indicates that the multiple pieces of image information are invalid, and the bill is scanned again.

10. The sensing method as claimed in claim 2, wherein the comparison result acquired when the image validation value is less than the validation threshold value indicates that the multiple pieces of image information are invalid, and the bill is scanned again.

11. The sensing method as claimed in claim 1, wherein the multiple image-sensing modules are complementary metal oxide semiconductor (CMOS) image sensor.

12. The sensing method as claimed in claim 1, wherein the multiple image-sensing modules scan the multiple pieces of image information of the bill by way of line-scan.

\* \* \* \* \*